United States Patent
Imai (10) Patent No.: US 9,188,846 B2
(45) Date of Patent: Nov. 17, 2015

(54) SCANNING-TYPE IMAGE DISPLAY DEVICE AND ITS IMAGE DISPLAY METHOD

(75) Inventor: Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 192 days.

(21) Appl. No.: 13/978,528

(22) PCT Filed: Feb. 15, 2012

(86) PCT No.: PCT/JP2012/053513
§ 371 (c)(1), (2), (4) Date: Jul. 5, 2013

(87) PCT Pub. No.: WO2012/111698
PCT Pub. Date: Aug. 23, 2012

(65) Prior Publication Data
US 2013/0286362 A1    Oct. 31, 2013

(30) Foreign Application Priority Data
Feb. 18, 2011 (JP) .................................. 2011-033184

(51) Int. Cl.
| | |
|---|---|
| G03B 21/20 | (2006.01) |
| H04N 9/31 | (2006.01) |
| G03B 21/53 | (2006.01) |
| G09G 3/02 | (2006.01) |
| G09G 3/34 | (2006.01) |
| G02B 26/10 | (2006.01) |

(52) U.S. Cl.
CPC ................ *G03B 21/53* (2013.01); *G09G 3/025* (2013.01); *G09G 3/3406* (2013.01); *H04N 9/3129* (2013.01); *G02B 26/105* (2013.01); *G03B 21/2033* (2013.01); *G09G 2310/0237* (2013.01); *G09G 2310/08* (2013.01); *G09G 2320/0233* (2013.01)

(58) Field of Classification Search
CPC ........... G03B 21/2033; G03B 21/2053; G03B 21/206; H04N 9/3129; H04N 9/3135
USPC ........................................................ 353/85
See application file for complete search history.

(56) References Cited

U.S. PATENT DOCUMENTS

| | | |
|---|---|---|
| 5,033,806 A | 7/1991 | Tomita et al. |
| 5,541,761 A | 7/1996 | Shibaguchi |
| 2010/0074651 A1 | 3/2010 | Koga |

(Continued)

FOREIGN PATENT DOCUMENTS

| | | |
|---|---|---|
| JP | 58-049963 A | 3/1983 |
| JP | 02-293809 A | 12/1990 |

(Continued)

OTHER PUBLICATIONS

International Search Report dated May 29, 2012 in PCT/JP2012/053513, with English translation thereof.

*Primary Examiner* — William C Dowling
*Assistant Examiner* — Ryan Howard
(74) *Attorney, Agent, or Firm* — McGinn IP Law Group PLLC (57) ABSTRACT

A scanning-type image display devices includes: a light source; a scanning unit that scans light beams emitted from light source to display an image on a projection plane; and a control unit that controls the emission time of the light beam from the light source for each pixel of the image, and that also controls the emission time for each pixel depending on the scanning angle of the scanning unit.

6 Claims, 9 Drawing Sheets

(56) References Cited

U.S. PATENT DOCUMENTS

2010/0182668 A1* 7/2010 Abe et al. .................. 359/202.1
2010/0315605 A1    12/2010 Arita

FOREIGN PATENT DOCUMENTS

| | | |
|---|---|---|
| JP | 07-333539 A | 12/1995 |
| JP | 2000-190554 A | 7/2000 |
| JP | 2003-021800 A | 1/2003 |
| JP | 2006-154337 A | 6/2006 |
| JP | 2007-121538 A | 5/2007 |
| JP | 2008-185943 A | 8/2008 |
| JP | 2008-268645 A | 11/2008 |
| JP | 2009-193008 A | 8/2009 |
| JP | 2009-198771 A | 9/2009 |
| JP | 2010-078857 A | 4/2010 |

* cited by examiner

SCANNING-TYPE IMAGE DISPLAY DEVICE AND ITS IMAGE DISPLAY METHOD

TECHNICAL FIELD

The present invention relates to an image display device, and more particularly to a scanning-type image display device for displaying images on a projection plane through scanning light beams.

BACKGROUND ART

A scanning-type image display device is known which irradiates coherent lights (for example white lights) emitted from a white light source such as a halogen lamp, a high-pressure mercury lamp, etc., onto planer display elements such as liquid crystal light valves, etc., and magnifies and projects lights emitted from the display elements on a screen through a projection lens for displaying images.

The aforementioned projection-type image display device is problematic in that a discharge lamp, which is used as a light source, such as a halogen lamp, a high-pressure mercury lamp, etc., requires a measurable amount of power.

By removing out lights of three primary colors of red (R), green (G), and blue (B) with a narrow spectrum width from white lights emitted from the light source, the image display device can achieve a high color reproducibility. However, the problem arises in which the light usage efficiency decreases due to narrowing of the spectrum width, thus darkening the projected image.

By setting wide spectrum widths of respective colors that correspond to the three primary colors for the maximum use of lights from the white light source, light usage efficiency can be increased. However, this decreases the color purity of the three primary colors and this causes a failure to achieve a high color reproducibility. In addition, widening the chromaticity range is also difficult.

Furthermore, since a projection-type image display device having planer display elements such as liquid crystal light valves, etc., inevitably becomes large-scale, miniaturizing the device is difficult.

Furthermore, when the distance from a projection lens to a screen takes a certain value, the image formed by display elements may not be projected within the focal depth of the projection lens, and the projected image may not be in focus. In this case, the user must perform an operation to adjust the focus of the projection lens depending on the distance from the projection lens to the screen. Such an operation to adjust the focus may impair user convenience.

Accordingly, scanning-type image display devices have been proposed wherein a laser light source is used as a light source, and a laser light emitted from the laser light source is two-dimensionally scanned to be projected on a screen for displaying an image (see Patent Document 1, 2).

Figure 1A:
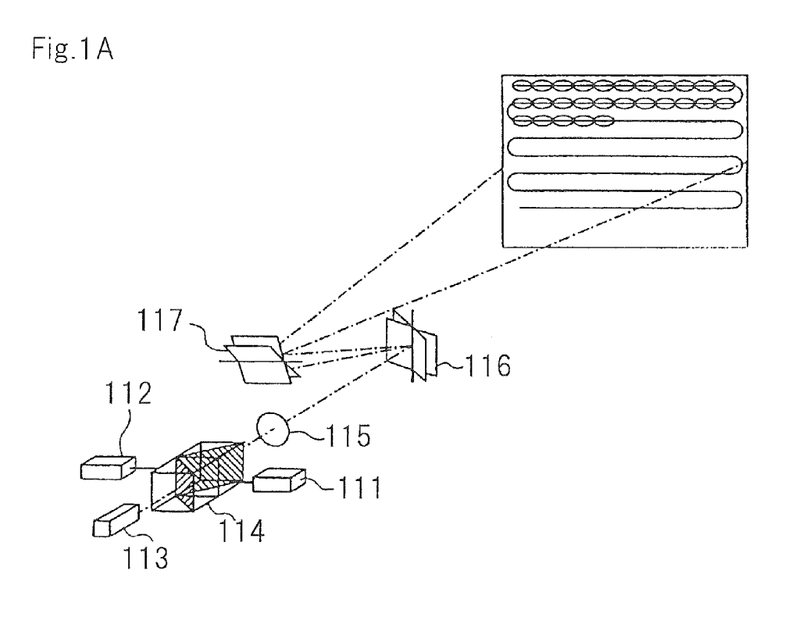
FIG. 1A is a diagrammatic illustration showing the configuration of a projection-type display device described in Patent document 1.

FIG. 1A shows the configuration of a projection-type image display device described in Patent Document 1.

Referring to FIG. 1A, the projection-type display device comprises light sources 111, 112, 113, color synthesis element 114, collimator lens 115, and light scanning elements 116, 117.

Light source 111 is a red semiconductor laser, light source 112 is a blue semiconductor laser, and light source 113 is a green solid laser. Here, the green solid laser extracts the second harmonic from the emitted light of an infrared semiconductor laser using a nonlinear optical crystal to acquire the green light.

Color synthesis element 114 synthesizes lights of each color of red, blue, and green from light sources 111 to 113. The light flux from color synthesis element 114 enters light scanning elements 116 through collimator lens 115.

Light scanning element 116 performs light scanning in a horizontal direction. Lights from light scanning element 116 enter light scanning element 117. Light scanning element 117 performs light scanning in a vertical direction.

By bringing the position of a beam waist into agreement with a projection plane through collimator lens 115, the above-described projection-type display device is capable of displaying a high-definition image.

Figure 1B:
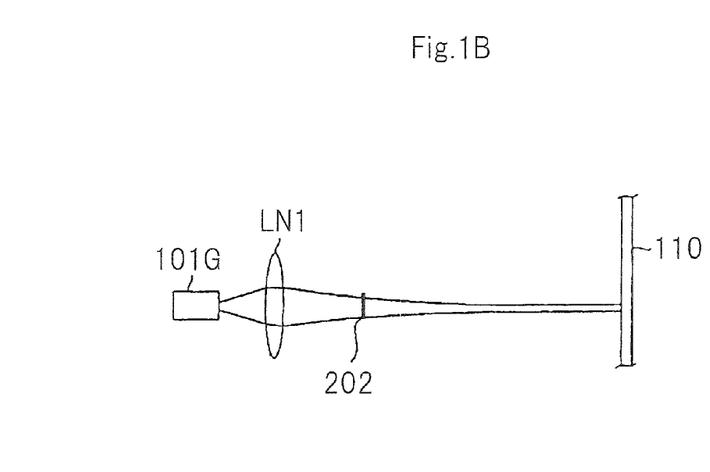
FIG. 1B is a diagrammatic illustration showing the configuration of an image display device described in Patent document 2.

FIG. 1B shows the configuration of an image display device described in Patent Document 2.

Referring to FIG. 1B, the image display device comprises light source section 101G, condensing optical system LN1 that condenses light beams from light source section 101G, and reflective mirror 202 that reflects the light beams condensed by condensing optical system LN1 toward screen 110.

Condensing optical system LN1 forms a beam waist at a position which is farther from reflective mirror 202 than from an intermediate position between reflective mirror 202 and screen 110. This reduces the beam diameter on reflective mirror 202, and can also inhibit enlargement of the beam diameter on screen 110. Accordingly, it is possible to miniaturize reflective mirror 202, and to display a high definition image.

In the devices described in the aforementioned Patent documents 1 and 2, a micro mechanical mirror is used as light scanning element 116 and reflective mirror 202.

A micro mechanical mirror described in Patent document 2 will now be described, by way of example.

This micro mechanical mirror comprises a mirror surface, a first substrate on which the mirror surface is fixed through a torsion bar, a second substrate which is arranged opposite to the first substrate, and a core consisting of a magnetic body which is formed on the side of the second substrate that faces the first substrate. The mirror surface is made into a rotary resonant state by an electromagnetic force generated in the core.

As a means for making the mirror surface into a rotary resonant state, an electrostatic actuator and an electromagnetic actuator can be used.

PRIOR TECHNICAL DOCUMENTS

Patent Document

Patent document 1: JP2003-21800 A
Patent document 2: JP2007-121538A

DISCLOSURE OF THE INVENTION

However, the devices described in the aforementioned Patent documents 1 and 2 suffer from the following problems.

Figure 2A:
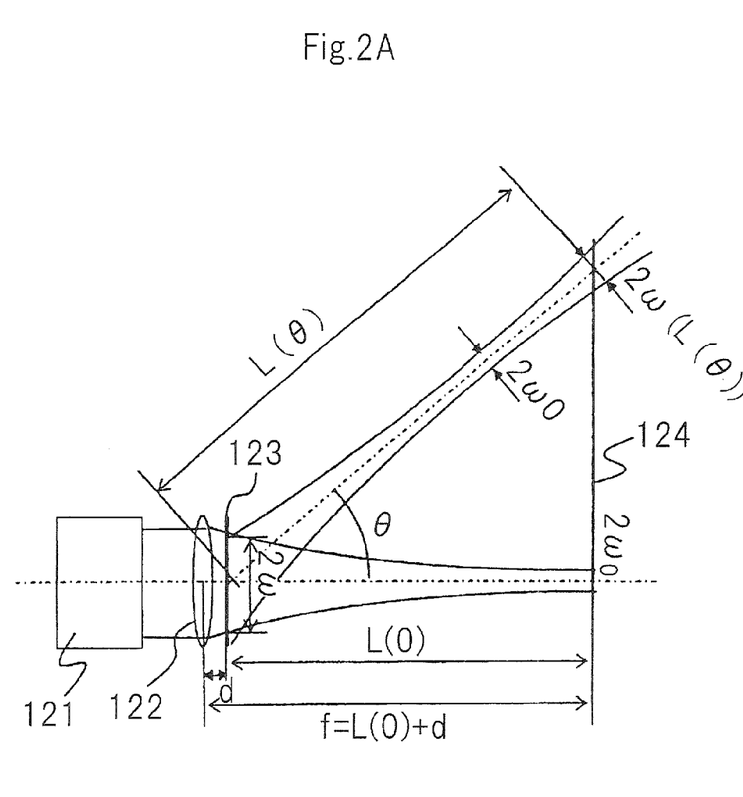
FIG. 2A is a diagrammatic illustration showing the major part of a scanning-type display device in which a beam waist is arranged on or near a projection plane.

FIG. 2A shows the major part of a scanning-type display device in which a beam waist is positioned at or near a projection plane. This major part corresponds to the major part of the devices described in Patent documents 1 and 2, and comprises light source 121, condenser lens 122 and scanning mirror 123 which are arranged in this order in a direction in which a laser beam emitted from light source 121 travels.

By arranging projection plane 124 at a position near the position corresponding to the focal point distance of condenser lens 122, and by condensing laser beams emitted from light source 121 by means of condenser lens 122, the beam waist can be positioned at or near the projection plane 124.

When the effective diameter (radius) of scanning mirror 123 is denoted by ω, the propagation distance is denoted by z, and the radius of a beam waist, which is formed at the distance at which the amplitude is decreased to a value of 1/e of its maximum value, is denoted by $\omega_0$, then these satisfy the following Equations 1 and 2. Here, λ is the wavelength of the laser beam, and π is a circular constant. The beam numerical aperture is given by ω/z.

$$\omega^2 = \omega_0^2 \cdot \{1 + (z/a)^2\} \quad \text{(Equation 1)}$$

$$a = \pi \cdot \omega_0^2 / \lambda \quad \text{(Equation 2)}$$

It is now assumed that the beam diameter (radius) on projection plane 124 is $\omega_0$ when the scanning angle θ is zero and the beam waist is arranged on light path length L(0). Light path length L(0) is the distance from the surface of scanning mirror 123 to projection plane 124 on the light path of the central light beam of the laser beams. Projection distance f is the distance from condenser lens 122 to projection plane 124, and is determined by the focal point distance of condenser lens 122. When the distance from a principal point of condenser lens 122 to the surface of scanning mirror 123 is denoted by d, then light path length L(0) is a value which is obtained by subtracting distance d from projection distance f.

The distance from the surface of scanning minor 123 to projection plane 124 on the light path of the central light beam of the laser beam when scanning angle θ is increased from zero, is assumed to be light path length L(θ). Then, light path length L(θ) is expressed by the following Equation 3.

$$L(\theta) = L(0)/\cos\theta \quad \text{(Equation 3)}$$

When scanning angle θ is increased from zero, propagation distance z in Equation 1 is increased because light path length L(θ) becomes larger than light path length L(0), and as a result, the beam diameter (radius) is enlarged from light path length ω(L(0)) to light path length ω(L(θ)) (First phenomenon).

Figure 2B:
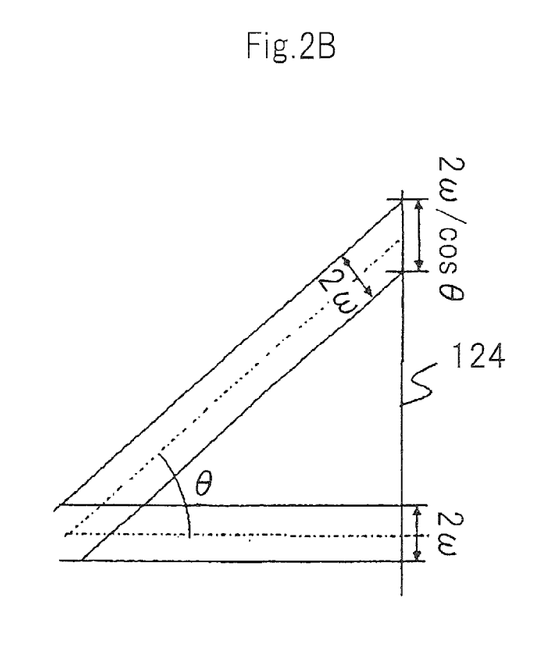
FIG. 2B is a diagrammatic illustration showing a change of the beam diameter on the projection plane when the scanning angle is increased from zero in the display device shown in FIG. 2A.

Further, when scanning angle θ is increased from zero, the laser beam obliquely enters projection plane 124, as shown in FIG. 2B, and beam diameter (radius) ω on projection plane 124 is enlarged in accordance with the following Equation 4 (Second phenomenon).

$$\omega = \omega/\cos\theta \quad \text{(Equation 4)}$$

The beam diameter on projection plane 124 is enlarged because of the First and Second phenomenon, thus decreasing the resolution on the screen.

The problem of the decrease of the resolution on the screen will be discussed in detail with reference to FIGS. 3A and 3B.

Figure 3A:
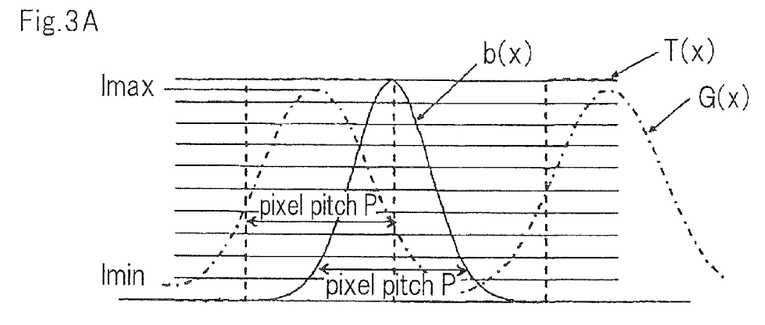
FIG. 3A is a view for explaining the relationship between the beam shape and an image resolving power when the beam diameter is equal to the pixel pitch.
Figure 3B:
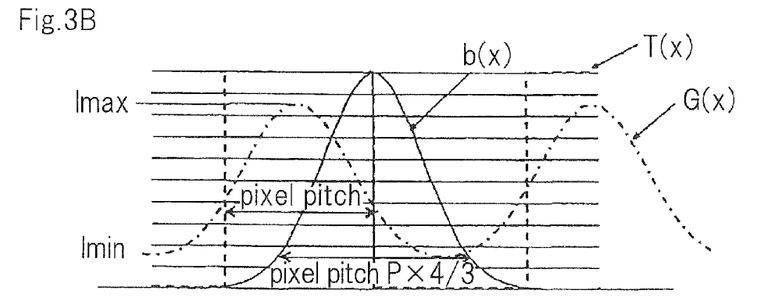
FIG. 3B is a view for explaining the relationship between the beam shape and an image resolving power when the beam diameter is increased to 4/3 times the pixel pitch.

FIGS. 3A and 3B are views showing the relationship between the beam shape and an image resolving power. Here, the beam shape is defined by the square of the distribution of amplitudes of waves on a cross-section perpendicular to the light axis, i.e., by the distribution of intensities.

FIG. 3A shows the relationship between beam shape function b(x), spatial expansion function T(x) of modulation waveform M (t), and convolution function G(x) when the beam diameter is equal to pixel pitch P. For convenience sake, modulation waveform M (t) is omitted in FIG. 3A.

Spatial expansion function T(x) is a function that is defined as T(V·t)=M(t) when the laser beam is being scanned with a fixed speed V. When the laser beam is rectangular-waveform modulated under the condition in which the duty cycle is 50%, and the emission time Δt and extinction time Δt are P/□, respectively, spatial expansion function T(x) becomes a spatial distribution of rectangular waveforms with a cycle two times pixel pitch P.

When beam shape function b(x) is the square of the Gauss function under the above conditions, resolving power contrast C of convolution function G(x) for an image to be displayed is 91%.

When the maximum value and minimum values of convolution function G(x) are denoted by Imax and Imin, respectively, then resolving power contrast C is expressed by the following Equation 5.

$$C = (I\max - I\min)/(I\max + I\min) \quad \text{(Equation 5)}$$

For example, when the beam diameter is enlarged to 4/3 times the pixel pitch, as shown in FIG. 3B, resolving power contrast C of convolution function G(x) is 71%.

As discussed hereinabove, the devices described in Patent documents 1 and 2 are problematic in that, because the beam diameter on a screen is enlarged as the scanning angle increases, the resolution on the periphery of the screen is decreased.

By narrowing down the beam waist, a high-definition image can be acquired throughout the screen. However, in order to narrow down the beam waist, the effective diameter of the scanning mirror must be increased, and the numerical aperture of the beam must be increased. Further, in order to increase the number of pixels to be displayed, the scanning angle must be increased.

In a resonant-type scanning mirror such as a micro mechanical mirror, etc., increasing the effective diameter of the mirror surface entails increasing of the inertia moment of the mirror surface. Accordingly, drive currents for electrostatic actuators and electromagnetic actuators that generate driving forces for resonant vibrations of the mirror surface must be increased, thus increasing power consumption.

Further, in a resonant-type scanning mirror, when the scanning angle is increased, the torsion bar (hinge) may break, making it difficult to assure the durability and reliability of the device.

It is an object of the present invention to provide a scanning-type image display device and its image display method which remedy the aforementioned problems to thereby inhibit the decrease of resolution power when the beam diameter on a projection plane is enlarged as the scanning angle increases.

To achieve the above object, in accordance with one aspect, there is provided a scanning-type image display device comprising: a solid light source; scanning means that scans light beams emitted from the light source to display an image on a projection plane; control means that controls the emission time of the light beam from the light source for each pixel of the image and that controls the emission time for each pixel depending on the scanning angle of the scanning means.

According to another aspect, there is provided an image display method that is performed in a scanning-type image display device in which an image is displayed on a projection plane by scanning light beams, the method comprising: controlling the emission time of the light beam for each pixel of the image, and also controlling the emission time for each pixel depending on a scanning angle of the light beam.

According to still anther aspect, there is provided a image display method that is performed in a scanning-type image display device that includes a variable-focus lens with a variable focal distance and in which an image is displayed on a projection plane by scanning light beams from the variable-focus lens, the method comprising: controlling the emission time of the light beam for each pixel of the image, controlling the emission time for each pixel depending on the scanning angle of the light beam, and controlling the focal distance of the variable-focus lens depending on the scanning angle.

EXPLANATION OF REFERENCE NUMBERS 1 light source
2 condenser lens
3 scanning means
4 laser modulation means
5 modulation waveform output calculation means
6 lookup table
7 video signal
8 synchronization signal

MODE FOR CARRYING OUT THE INVENTION

Exemplary embodiments of the present invention will now be described in detail with reference to the accompanying drawings.

(First Exemplary Embodiment)

Figure 4:
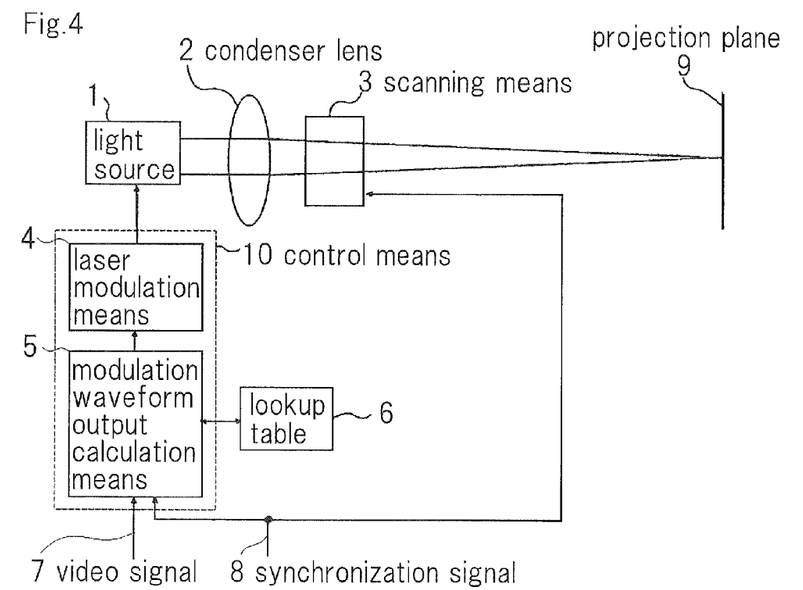
FIG. 4 is a block diagram showing the configuration of a scanning-type image display device according to a first exemplary embodiment of the present invention.

FIG. 4 is a block diagram illustrating the configuration of a scanning-type image display device according to a first exemplary embodiment of the present invention.

Referring to FIG. 4, the scanning-type image display device is of a rear projection type, and comprises light source 1, condenser lens 2, scanning means 3, lookup table 6, control means 10, and projection plane 9. The distance from scanning means 3 to projection plane 9 is fixed.

Control means 10 is adapted to control the operation of the entire scanning-type image display device, and comprises laser modulation means 4 and modulation waveform output calculation means 5.

Video signal 7 from an external device is supplied to modulation waveform output calculation means 5. Synchronization signal 8, which is used for vertical synchronization and horizontal synchronization in displaying images through image signal 7, is supplied to modulation waveform output calculation means 5 and scanning means 3 from the external device. The external device is a video supply device such as, for example, a personal computer, etc.

Light source 1 is a solid light source as typified by a semiconductor laser. Condenser lens 2 and scanning means 3 are arranged in this order in the direction of travel of the laser beam from light source 1. Condenser lens 2 serves to collect laser beams from light source 1.

Scanning means 3 is a resonant type scanning mirror as typified by a micro mechanical mirror. Scanning means 3 scans laser beams condensed by condenser lens 2 in accordance with synchronization signal 8 to display images on projection plane 9. When scanning means 3 performs a two-dimensional scanning in a horizontal direction and in a vertical direction, scanning in the horizontal direction is performed based on the horizontal synchronization signal and scanning in the vertical direction is performed based on the vertical synchronization signal.

Lookup table 6 stores characteristic data indicative of beam expansion (a change in the beam diameter) due to the light path length difference and oblique projection with respect to the scanning angle. This characteristic data can be calculated based on the aforementioned Equations 1 to 4.

For example, the characteristic data are data in tabular form that are indicative of a beam expansion (a change in beam diameter) for each scanning angle when the canning angle θ is changed in a step-by-step manner within the range from 0° to a maximum angle θmax. The step width for the scanning angle is 0.5°, for example, but is not limited thereto. The step width for the scanning angle can be set as appropriate.

Figure 5:
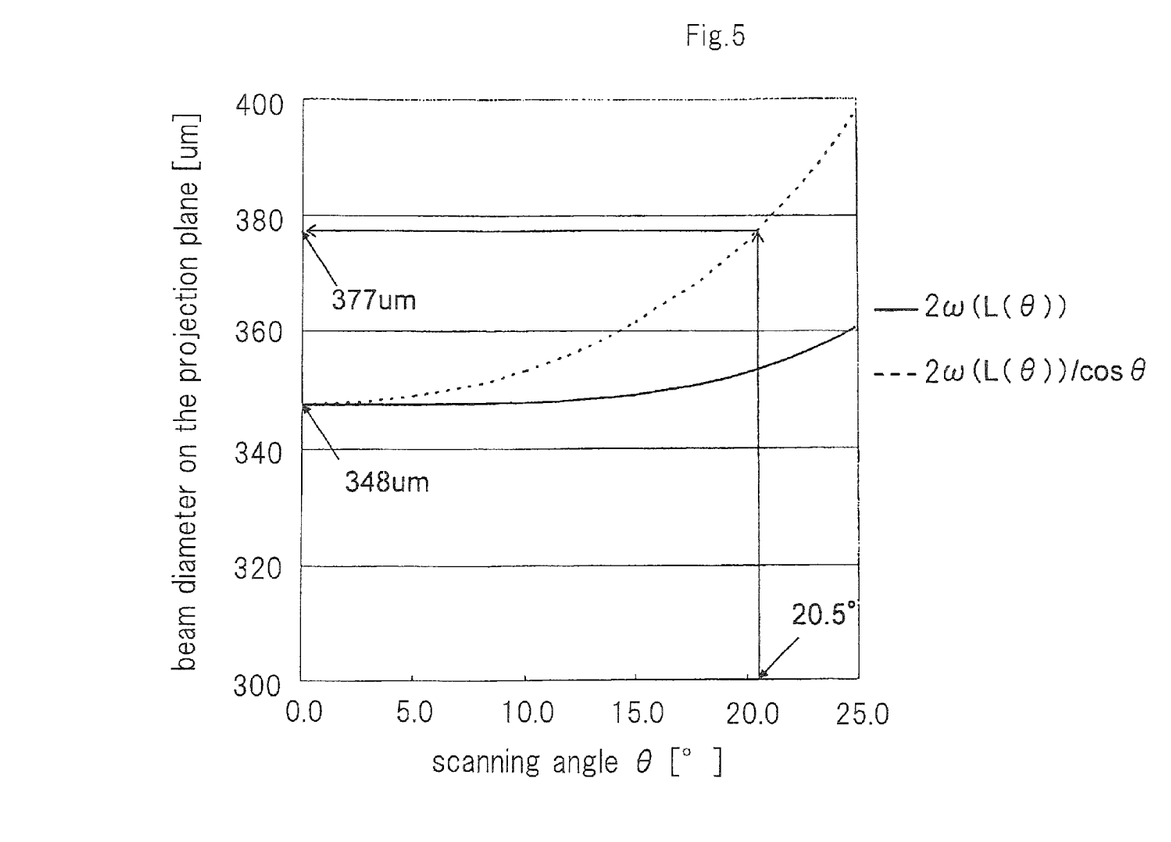
FIG. 5 is a characteristic chart showing one example of characteristic data that is indicative of the beam expansion due to the light path length difference and an oblique projection with respect to a scanning angle, and that is used in the scanning-type display device shown in FIG. 4.

Data for the beam expansion contain an influence that results from the difference between the light path length L(θ) and the light path length L(0) shown in FIG. 2A, and an influence that results from the oblique projection shown in FIG. 2B. FIG. 5 shows an example of the characteristic data based on the data for such a beam expansion.

In FIG. 5, the curve (2ω(L(θ))) in solid line shows the beam expansion that contains an influence that results from the light path length difference. The curve (2ω(L(θ)/cos θ)) in dotted line shows the beam expansion that contains an influence that results from the light path length difference shown in FIG. 2A, and an influence that results from the oblique projection shown in FIG. 2B. Lookup table 6 is generated based on the characteristic data that corresponds to the curve shown in dotted line.

In the example shown in FIG. 5, it is assumed that a screen is divided into halves with reference to an irradiated position on projection plane 9 when scanning angle θ is zero, with the size being 150 mm, the number of pixels being 512, and the pixel pitch being 293 μm (corresponds to the value obtained by dividing the screen size by the number of pixels). The beam diameter ω on the mirror surface of scanning means 3 is 1 mm, wavelength λ of the laser beam is 640 nm, light path length L(0) is 400 nm, and the maximum deflection angle of the scanning angle is 20.5°. Under these conditions, the beam diameter on projection plane 9 (the dotted line: 2ω(L(θ))/cos θ) is 348 μm when the scanning angle θ is zero, which is about 1.2 times the pixel pitch of 293 μm. When the scanning angle θ is 20.5°, the beam diameter is 377 μm, which is about 1.3 times the pixel pitch of 293 μm.

Modulation waveform output calculation means 5 reads the characteristic data retained on lookup table 6 based on synchronization signal 8. By synchronizing reading of the characteristic data and scanning through scanning means 3 with synchronization signal 8, modulation waveform output calculation means 5 can obtain scanning angles for respective pixels of an image which is based on video signal 7.

For example, when a reciprocating scanning is carried out from the upper side toward the lower side with the upper left point and the lower right point on the display area of projection plane 9 as a start point and an end point, respectively, the start point and the end point can be recognized through the vertical synchronization signal included in synchronization signal 8. Further, the position of each pixel (irradiation timing) can be recognized based on the horizontal synchronization signal. Since the scanning angle for each pixel is known in advance, the scanning angle for each pixel can be determined from its position (irradiation timing).

Modulation waveform output calculation means 5 obtains a beam diameter corresponding to the scanning angle of scanning means 3 based on the characteristic data that is read from lookup table 6, calculates a modulation time based on the obtained beam diameter, and generates a modulation waveform signal based on the calculated result. In addition, modulation waveform output calculation means 5 generates an intensity modulated signal based on video signal 7.

Figure 6A:
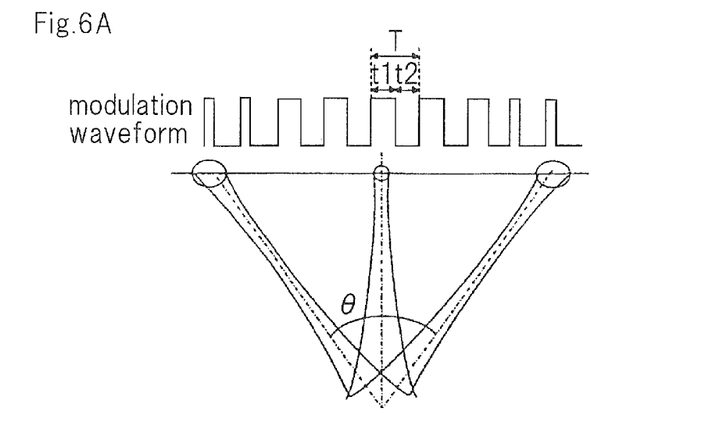
FIG. 6A is diagrammatic illustration showing the relationship between the scanning angle and a modulation waveform signal in the scanning-type display device shown in FIG. 4.

FIG. 6A illustrates the relationship between the scanning angle and the modulation waveform signal. This modulation waveform signal has a modulation waveform in which modulation time T consisting of emission time t1 and extinction time t2 varies depending on scanning angle θ. Emission time t1 corresponds to one pixel.

Modulation time T is decreased with an increase in scanning angle θ such that the scanning speed of the laser beam on projection plane 9 may become constant.

Figure 6B:
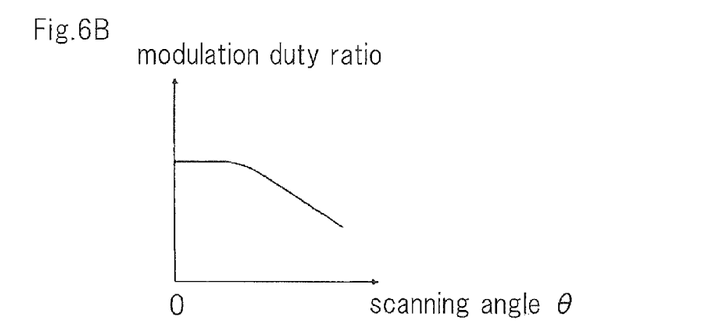
FIG. 6B is a characteristic chart showing a change in the duty cycle of the modulation waveform signal used in the scanning-type display device shown in FIG. 4.

FIG. 6B shows a change in the duty cycle of the modulation waveform signal. In FIG. 6, the axis of ordinate denotes the modulated duty cycle, and the axis of abscissas denotes scanning angle θ. The modulated duty cycle is the ratio of emission time t1 to extinction time t2. As shown in FIG. 6B, when scanning angle θ is increased, then the modulated duty cycle is decreased.

Figure 6C:
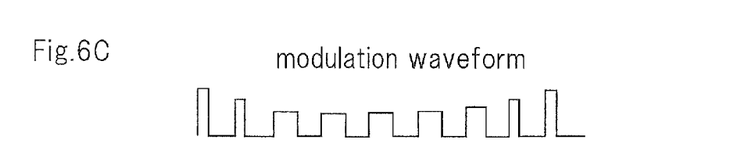
FIG. 6C is a waveform chart showing one example of the modulation waveform signal used in the scanning-type display device shown in FIG. 4.

Further, as shown in FIG. 6C, the amplitude of the modulation waveform may be changed depending on the scanning angle. Specifically, the amplitude of the modulation waveform may be increased with an increase in the scanning angle. This makes the energy of the laser beam per pixel constant.

The modulation waveform signal and the intensity modulated signal that are generated by modulation waveform output calculation means 5 are supplied to laser modulation means 4. Modulation waveform output calculation means 5 may supply a modulated signal (specifically a modulation waveform signal shown in FIG. 6C whose amplitude is changed based on video signal 7), which is the modulation waveform signal plus the intensity modulated signal, to laser modulation means 4.

Laser modulation means 4 controls the emission time of the laser beam emitted from light source 1, based on the modulation waveform signal from modulation waveform calculation means 5. Laser modulation means 4 controls the intensity of the laser beam emitted from light source 1, based on the intensity modulated signal from modulation waveform output calculation means 5.

For example, when light source 1 is a semiconductor laser, laser modulation means 4 controls the supply of currents (an amount and a time of supply of currents), based on the modulation waveform signal and the intensity modulated signal. Further, when laser modulation means 4 has a modulator for modulating the laser beam from light source 1, laser modulation means 4 controls the transmittance of the modulator based on the modulation waveform signal and the intensity modulated signal.

By controlling the emission time of the laser beam depending on the scanning angle, the scanning-type image display device of the present exemplary embodiment can maintain its resolving power, even when the beam diameter on projection plane 9 is enlarged with an increase in the scanning angle, at a resolution prior to the increase in the scanning angle (i.e., the resolution when the scanning angle is zero).

The principle whereby the resolution is maintained will now be specifically explained.

Figure 7A:
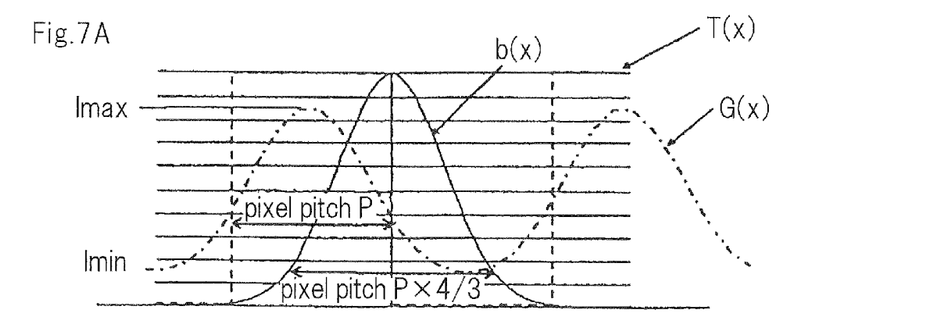
FIG. 7A is a characteristic chart showing the relationship between beam shape function b(x), spatial expansion function T(x), and convolution function G(x) in a state in which the beam diameter has been expanded to 4/3 times the pixel pitch, without a modulation control depending on a scanning angle.

FIG. 7A is a characteristic chart illustrating the relationship between beam shape function b(x), spatial expansion function T(x), and convolution function G(x) in a state in which the beam diameter has been increased to 4/3 times the pixel pitch, when control by means of laser modulation means 4 is not applied. The definitions of beam shape function b(x), spatial expansion function T(x), and convolution function G(x) were mentioned earlier.

In the example shown in FIG. 7A, resolution contrast C of convolution function G(x) is 71% due to the enlargement of the beam diameter, resulting in low resolution of image.

Figure 7B:
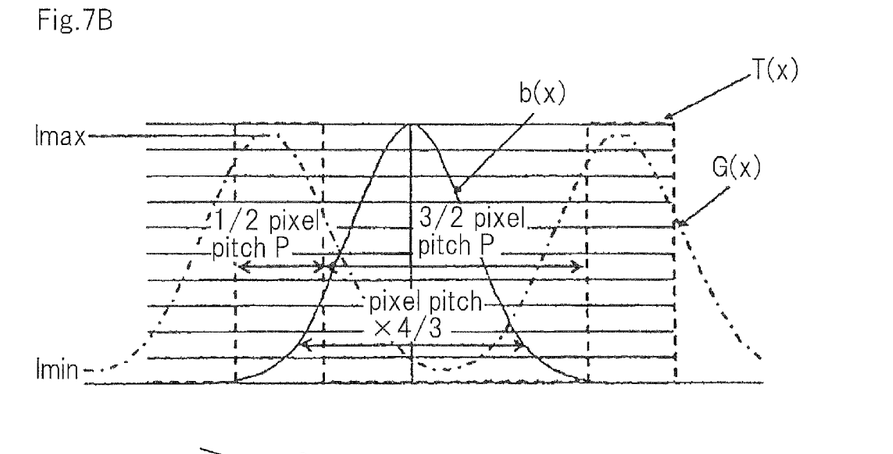
FIG. 7B is a characteristic chart showing the relationship between beam shape function b(x), spatial expansion function T(x), and convolution function G(x) in a state in which the beam diameter has been expanded to 4/3 times the pixel pitch, with a modulation control depending on a scanning angle.

FIG. 7B is a characteristic chart illustrating the relationship between beam shape function b(x), spatial expansion function T(x), and convolution function G(x) in a state in which the beam diameter has been enlarged to 4/3 times the pixel pitch, when control by means of laser modulation means 4 is applied.

In the example shown in FIG. 7B, laser modulation means 4 controls the emission time of the laser beam from light source 1 based on the modulation waveform signal with the laser beam emission time t1 of (½)Δt and with the laser beam extinction time t2 of (3/2)Δt. This achieves a resolving power contrast C of convolution function G(x) of 91% for an image to be displayed, which is equivalent to the resolving power contrast when the beam diameter is equal to the pixel pitch (FIG. 3A).

For example, when the laser beam is modulated under the condition as explained with respect to FIG. 5, a resolving power contrast can be achieved in which the beam diameter is equal to or greater than the pixel pitch, if the enlargement of the beam is within 4/3 (1.33) times.

A specific description will now be given for the relationship between a beam shape and a modulation signal, and the improved effect of a contrast due to a control based on the modulation waveform signal.

Figure 8A:
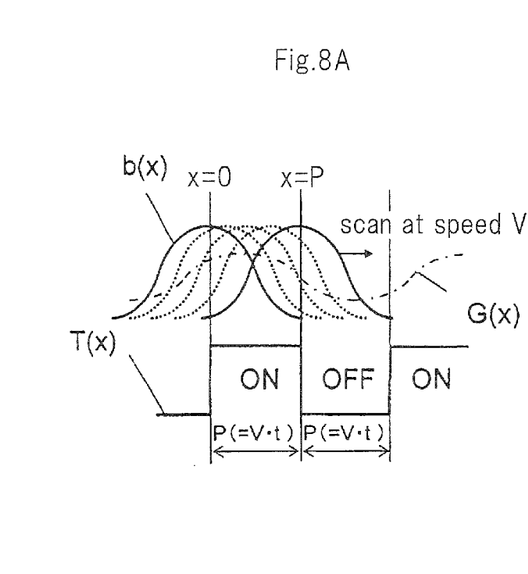
FIG. 8A is a view for explaining the relationship between the beam shape and the modulation signal when scanning is carried out at a fixed speed.

FIG. 8A is a view for explaining the relationship between a beam shape and a modulation signal when scanning is carried out at speed V.

In the example shown in FIG. 8A, the laser beam is on/off controlled at intervals of pixel pitch P (=V·t), and the modulation duty cycle is 50%. Spatial expansion function T(x) in this case is defined as T(V·t)=M(t).

Convolution function G(x) for an image to be displayed is expressed by the following Equation 6, i.e., the convolution integral of beam shape function b(x) and spatial expansion function T(x). In Equation 6, N is the number of pixels.

$$G(x) = \int_0^{P \times N} b(x-s) \cdot T(x) ds \quad \text{(Equation 6)}$$

Figure 8B:
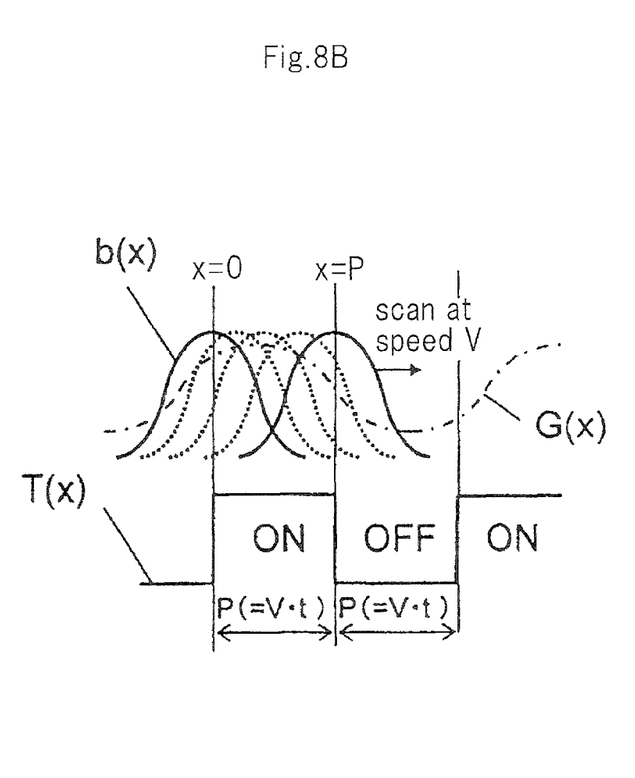
FIG. 8B is a view for explaining the relationship between a beam shape and a modulation signal when scanning is carried out at a fixed speed, and the beam diameter has outgrown the pixel pitch.

When the beam diameter becomes larger than pixel pitch P under the above conditions, then resolving power contrast C of convolution function G(x) for an image to be displayed is decreased, as shown in FIG. 8B.

So, in the present exemplary embodiment, when the beam diameter becomes larger than pixel pitch P, a modulation control is performed which will shorten emission time t1 of the laser beam.

Figure 8C:
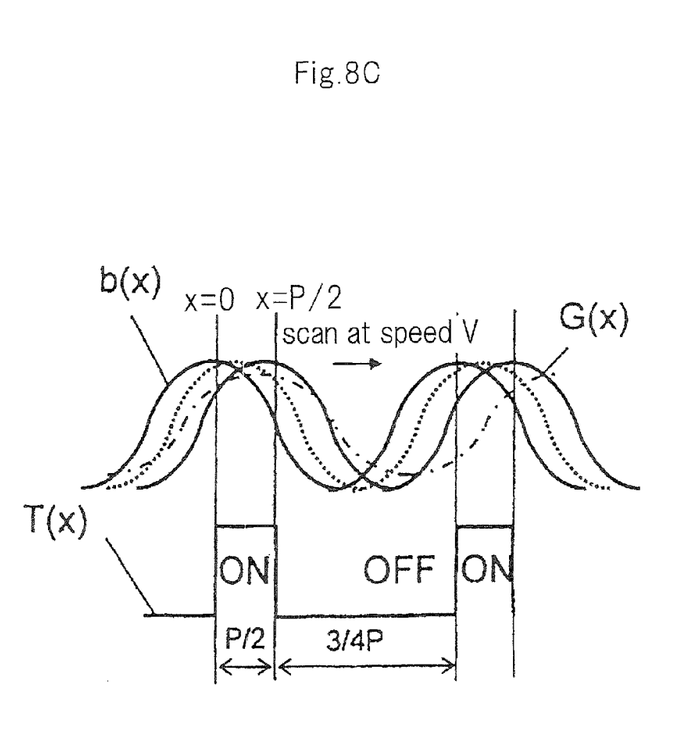
FIG. 8C is a view for explaining the relationship between the beam shape and the modulation signal when a scanning is carried out at a fixed speed, and the beam diameter has outgrown the pixel pitch, by means of a modulation control in which the emission time of the laser beam is decreased.

FIG. 8C shows the relationship between the beam shape and the modulation signal when such a modulation control is performed.

In the example shown in FIG. 8C, emission time t1 is P/2, and extinction time t2 is (¾)×P. According to this modulation signal, resolution power contrast C of convolution function G(x) for an image to be displayed is substantially equal to that in the case shown in FIG. 8A.

As discussed hereinabove, the scanning-type image display device according to the present exemplary embodiment is capable of inhibiting a decrease of the resolving power when the beam diameter on the projection plane is enlarged with an increase in the scanning angle.

By increasing the mirror diameter, it is possible to make the beam diameter on the projection plane a value that corresponds to the pixel pitch. However, in this case, for example, when the conditions shown in the explanation with respect to FIG. 5 are applied, the beam diameter on the projection plane needs to be enlarged from 1000 μm to 1300 μm (enlargement factor: 30%). In this case, the inertia moment in a direction perpendicular to a rotational axis increases proportional to the cube of the mirror diameter. This necessitates an at least 2.2-times drive force (torque), thus increasing consumed power.

In general, when the diameter of the scanning mirror is enlarged, the inertia moment is further increased in order to increase the thickness of the mirror for the increase of rigidity. For this reason, when the scanning angle is increased, a larger drive force must be given. As a result, the inertia moment may exceed a twist yielding point for a torsion bar, resulting in the breakage of the torsion bar.

The scanning image display device according to the present exemplary embodiment is capable of maintaining a resolving power contrast without increasing the effective diameter of the mirror surface of scanning means 3. This, therefore, eliminates the need for fabricating a scanning mirror with a large inertia moment, and makes it possible to secure durability and reliability of the device.

In the present exemplary embodiment, scanning angle θ refers to a scanning angle in a horizontal direction and/or a scanning angle in a vertical direction. When scanning angle θ refers to a scanning angle either in a horizontal or in a vertical direction, the emission time and intensity of the light beam are controlled for either the horizontal or vertical directions depending on the scanning angle. When scanning angle θ refers to a scanning angle both in a horizontal and in a vertical direction, the emission time and intensity of the light beam are controlled for both horizontal and vertical directions, respectively, depending on the scanning angle.

Lookup table 6 may store first characteristic data indicative of the correspondence relationship between the beam expansion that results from a light path length difference and the scanning angle and/or second characteristic data indicative of the correspondence relationship between the beam expansion that results from an oblique projection and the scanning angle.

When the first characteristic data is stored in lookup table 6, a decrease in the resolving power that results from the influence of the light path length difference shown in FIG. 2A can be inhibited. When the second characteristic data is stored in lookup table 6, a decrease in the resolving power that results from the influence of the oblique projection shown in FIG. 2B can be inhibited.

Condenser lens 2 may be eliminated, and instead, a collimated light beam from light source 1 may be scanned to display an image on projection plane 9. In this case, since only an effect due to the oblique projection shown in FIG. 2B may be considered, only the second characteristic data is stored in lookup table 6.

(Second Exemplary Embodiment)

Figure 9:
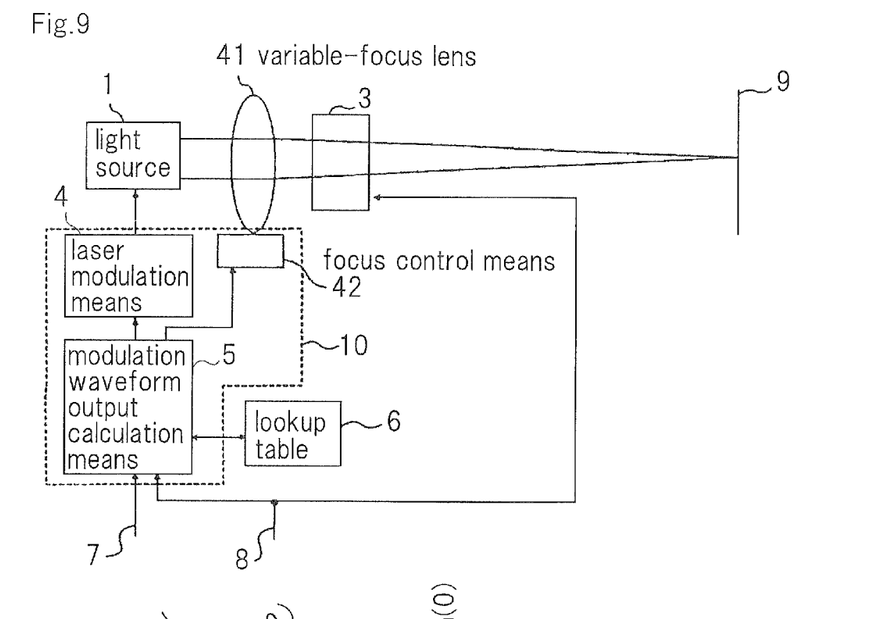
FIG. 9 is a block diagram showing the configuration of a scanning-type image display device according to a second exemplary embodiment of the present invention.

FIG. 9 is a block diagram illustrating the configuration of a scanning-type image display device according to a second exemplary embodiment of the present invention.

The scanning-type image display device according to the present exemplary embodiment differs from the first exemplary embodiment in that condenser lens 2 is replaced by variable focusing lens 41, and focus control means 42 for controlling variable focusing lens 41 has been added.

Modulation waveform output and calculation means 5 calculates a focal point distance depending on scanning angle θ of scanning means 3, based on characteristic data obtained from lookup table 6, and supplies the calculation result of the focal point distance to focus control means 42. The relationship between scanning angle θ of scanning means 3 and the focal point distance of variable focusing lens 41 may be calculated in accordance with the aforementioned Equation 3.

The calculation of the focal point distance in modulation waveform output calculation means 5 and the transmission of the calculation result thereof are performed in synchronization with synchronization signal 8. Focus control means 42 controls the focal point distance of variable focusing lens 41 based on the calculation result of the focal point distance from modulation waveform output calculation means 5.

Figure 10A:
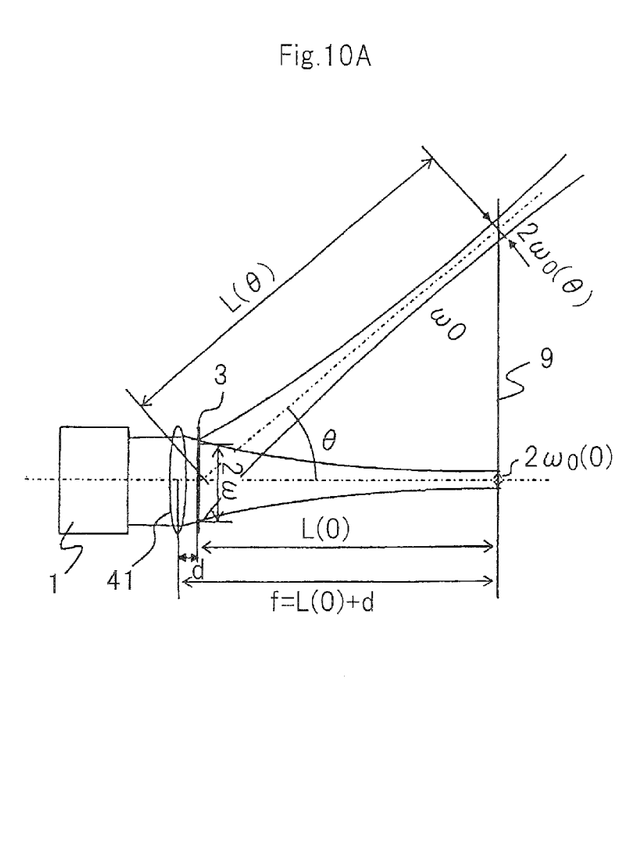
FIG. 10A is a diagrammatic illustration showing a change in the focal distance of variable-focus lens and a change in the beam diameter in the scanning-type image display device shown in FIG. 9.

FIG. 10A diagrammatically shows a change in the focal point distance of variable focusing lens 41 and a change in the beam diameter. Focus control means 42 controls the focal point distance of variable focusing lens 41 based on scanning angle θ.

Figure 10B:
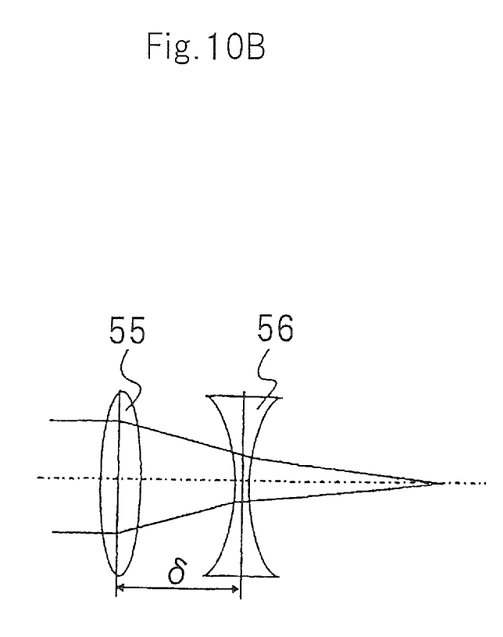
FIG. 10B is a diagrammatic illustration showing a state of a variable-focus lens when scanning angle θ is increased, in the scanning-type image display device shown in FIG. 9.
Figure 10C:
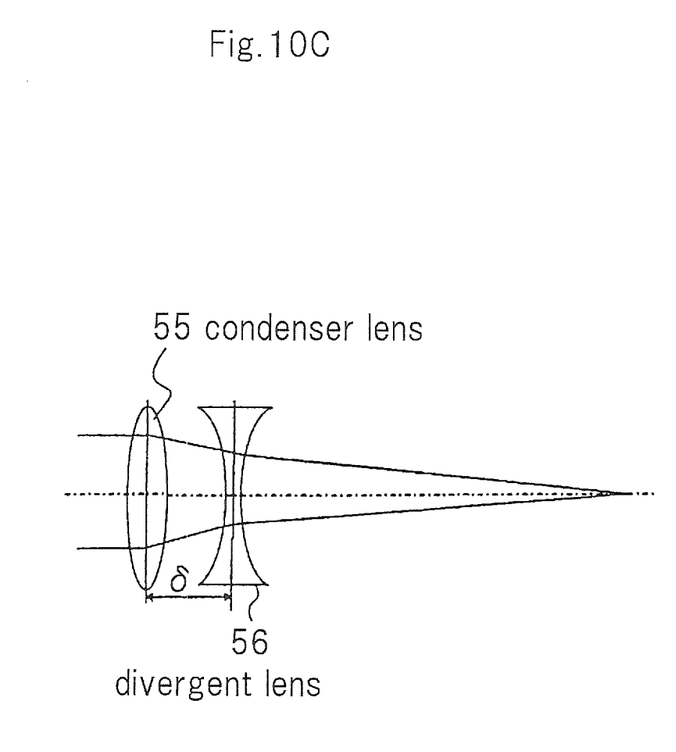
FIG. 10C is a diagrammatic illustration showing a state of a variable-focus lens when scanning angle θ is zero, in the scanning-type image display device shown in FIG. 9.

FIG. 10B shows a state of variable focusing lens 41 when scanning angle θ is increased, and FIG. 10C shows a state of variable focusing lens 41 when scanning angle θ is zero.

Variable focusing lens 41 shown in FIGS. 10B and 10C is made up of condenser lens 55 and diverging lens 56, with distance δ therebetween being adjustable. Distance δ is adjusted using an electromagnetic actuator, for example. As an adjustment means of distance δ, other than an electromagnetic actuator, various types of actuators such as an electrostatic actuator, etc. may be used.

When scanning angle θ is zero, focus control means 42 sets the distance δ between condenser lens 55 and diverging lens 56 at a predetermined value, as shown in FIG. 10C. When scanning angle θ is increased from this state, focus control means 42 makes the distance δ between condenser lens 55 and diverging lens 56 less than the predetermined value depending on the change.

This control allows a reduction of influence that results from a light path length difference (First phenomenon shown in FIG. 2A) because the beam waist always exists on projection plane 9 throughout the entire angle range of scanning angle θ. As a result, enlargement of the beam diameter includes only the influence that results from an oblique projection (Second phenomenon shown in FIG. 2B).

It is noted that the configurations of variable focusing lens 41 shown in FIGS. 10B and 10C are examples only, and should not be restricted thereto. Variable focusing lens 41 may be of any configuration only if it is able to change the focal point distance.

Lookup table 6 stores characteristic data that is indicative of the relationship between a change in the scanning angle and the beam expansion that results from an oblique projection. Data for the beam expansion also includes influence that results from an oblique projection shown in FIG. 2B. This characteristic data can also be calculated based on the aforementioned Equations 1 to 4.

For example, the characteristic data are data in tabular form of the beam expansion for each scanning angle, when scanning angle θ is changed in a stepwise fashion in the range from zero to the maximum angle θ max. The step width for the scanning angle is 0.5°, for example, but is not restricted thereto.

Modulation waveform output calculation means 5 reads the characteristic data held in lookup table 6 in synchronization with synchronization signal 8. Modulation waveform output calculation means 5 generates a modulation waveform signal based on the characteristic data that is read from lookup table 6, and also generates an intensity modulated signal based on video signal 7.

Laser modulation means 4 controls the emission time of the laser beam emitted from light source 1, based on the modulation waveform signal from modulation waveform output calculation means 5. In addition, laser modulation means 4 controls the intensity of the laser beam emitted from light source 1, based on the intensity modulated signal from modulation waveform output calculation means 5.

The scanning-type image display device according to the present exemplary embodiment is capable of inhibiting influence of the beam expansion that results from an oblique projection by controlling the emission time and intensity of the laser beam emitted from light source 1 based on the scanning angle, and is capable of inhibiting influence of the beam expansion that results from a light path length difference by controlling the focal point distance of variable focusing lens 41 based on the scanning angle. Thus, the scanning-type image display device according to the present exemplary embodiment provides the same effect as the effect provided by the scanning image display device according to the first exemplary embodiment.

Furthermore, since there is no need to consider influence that results from the light path length difference, generation of the characteristic data for lookup table 6 is easy.

In the present exemplar embodiment, scanning angle θ refers to a scanning angle in a horizontal direction and/or a scanning angle in a vertical direction. When scanning angle θ refers to a scanning angle either in a horizontal or in a vertical direction, the emission time and intensity of the light beam are controlled for either the horizontal or vertical directions depending on the scanning angle. When scanning angle θ refers to a scanning angle both in a horizontal and in a vertical direction, the emission time and intensity of the light beam are controlled for both horizontal and vertical directions, respectively, depending on the scanning angle.

Specific Examples

The aforementioned scanning-type image display devices according to the first and second exemplary embodiments each comprises a red laser light source, a green laser light source, and a blue light source, as light source 1. The beam diameter of the laser light source for each color is 1000 μm.

The red laser light source is a semiconductor laser having a wavelength of 640 nm. The blue laser light source is a semiconductor laser having a wavelength of 440 nm. The modulation of the red and blue light sources is carried out through a current control.

The green laser light source is a laser light source that utilizes the second harmonic (532 nm) of an infrared laser light having a wavelength of 1064 nm. The modulation of the green laser light source is carried out using an acoustooptical element.

The focal point distance of condenser lens 2 is 400 mm. Scanning means 3 comprises a resonant micro-mechanical scanning element for horizontal scanning, and an electromagnetically driven galvanometer for vertical scanning.

The resonant micro-mechanical scanning element is driven via a drive signal having a frequency of 27 kHz, and its deflection angle is ±20°. The resonant micro-mechanical scanning element has a circular mirror with a diameter of 1,500 μm that can withstand driving at the frequency of 27 kHz.

The electromagnetically driven galvanometer is driven via a sawtooth drive signal with a frequency of 60 Hz, and its deflection angle is ±15°. The electromagnetically driven galvanometer has a rectangular mirror with a dimension of 1,500 μm×6,000 μm.

The aforementioned scanning-type image display devices according to the first and second exemplary embodiments each has a resolution with 1,024 pixels in a horizontal direction and 768 pixels in a vertical direction. However, the resolution is not limited thereto, and a resolution with other pixels may be employed.

The screen size is 300 cm in the horizontal direction and 200 cm in the vertical direction at a projection distance of 400 cm.

For the laser beam of each color, an emission and intensity control is carried out in synchronization with a scanning element and at a unit time of 1 ns which is less than 1/10 of the pixel clock (15.4 ns).

In the present specific example as well, a resolving power was maintained even when the beam diameter on projection plane 9 was enlarged with an increase of the scanning angle. Further, a resolving power contrast was maintained without increasing the effective diameter of the scanning mirror. Furthermore, since there is no need to fabricate a scanning mirror with a larger inertia moment, it was possible to secure durability and reliability of the device.

In the specific example, the modulation of the green laser light source may be carried out using a method that modulates the infrared semiconductor to convert it to the second harmonic.

A fiber laser or a semiconductor laser may be used as the green laser light source.

As the intensity modulation means for the laser, various types of optical modulators such as grating type MEMS modulator, a waveguide type modulator, an electro-optic crystal, etc., may be used.

For horizontal and vertical scannings, an acoustooptical element, an electro-optic crystal, etc., may be used, and an optical system may be used in which the deflection angle is increased by means of a prism etc., that uses a photonic crystal.

A beam deflection section (a mirror etc.) for elements of horizontal and vertical scanning may be of any size and shape only if it is larger than a collimated beam diameter.

(Other Embodiment)

A scanning image display device according to another exemplary embodiment comprises: a solid light source; a scanning means that scans the light beam emitted from the solid light source to display an image on a projection plane; and a control means that controls the emission time of a light beam from the solid light source for each pixel of the image, and controls the emission time for each pixel depending on the scanning angle of the scanning means.

The above-described configuration makes it possible to inhibit a decrease in the resolving power when the beam diameter on a projection plane is enlarged with an increase in the scanning angle.

Although the present invention has been described with reference to the embodiments, it should be understood that the present invention is not restricted to the embodiments. For the configurations and operations of the present invention, various changes and modifications that any person skilled in the art can understand can be made without departing from the sprit of the present invention.

This application claims the benefit of priority based on Japanese Patent Application No. 2011-033184 filed on Feb. 18, 2011, the entire disclosure of which is hereby incorporated by reference.

What is claimed is:

1. A scanning-type image display device comprising:
a solid light source;
a scanning unit that scans light beams emitted from said light source to display an image on a projection plane; and
a control unit that controls an emission time of the light beam from said light source for each pixel of said image and that controls the emission time for each pixel depending on a scanning angle of said scanning unit,
wherein said scanning-type image display device further includes a lookup table that stores data indicative of a change in a beam diameter on the projection plane with respect to the scanning angle, wherein said control unit is adapted to obtain the beam diameter that depends on the scanning angle by referring to said lookup table, and is adapted to calculate said emission time based on the obtained beam diameter,
wherein said control unit includes:
a calculation unit that generates a modulation waveform signal for modulating the light beam based on the emission time that has been calculated from the beam diameter; and
a modulation unit that performs a modulation control of the light beam based on the modulation waveform signal, and
wherein said calculation unit is adapted to generate the modulation waveform signal such that a resolving power contrast that is determined from a value of a convolution integral of a spatial expansion function for the modulation waveform signal is fixed for each pixel.

2. The scanning-type image display device according to claim 1, wherein said calculation unit is adapted to determine an amplitude of the modulation waveform signal such that light energy applied to each pixel within the emission time is fixed.

3. The scanning-type image display device according to claim 1, further comprising a variable-focus lens with a variable focal distance for condensing light beams from said solid light source, wherein said control unit further includes a focal distance control unit that controls the focal distance of said variable-focus lens depending on the scanning angle.

4. The scanning-type image display device according to claim 3, wherein said focal distance control unit is adapted to control the focal distance such that the focal spot of said variable-focus lens is positioned on the projection plane for any scanning angle of said scanning unit.

5. An image display method that is performed in a scanning-type image display device in which an image is displayed on a projection plane by scanning light beams, said method comprising: controlling an emission time of the light beam for each pixel of said image, and controlling an emission time for each pixel depending on a scanning angle of said light beam,
wherein said method further comprises:
referring to a lookup table, that stores data indicative of a change in a beam diameter on the projection plane with respect to the scanning angle, to obtain the beam diameter that depends on the scanning angle;
calculating said emission time based on the obtained beam diameter;
generating, based on the emission time that has been calculated, a modulation waveform signal such that a resolving power contrast that is determined from a value of the convolution integral of a spatial expansion function for the modulation waveform signal is fixed for each pixel, and
modulating the light beam based on the generated modulation waveform signal.

6. An image display method that is performed in a scanning-type image display device that includes a variable-focus lens with a variable focal distance and in which an image is displayed on a projection plane by scanning light beams from said variable-focus lens, said method comprising: controlling an emission time of the light beam for each pixel of the image, controlling the emission time for each pixel depending on a scanning angle of said light beam, and controlling the focal distance of said variable-focus lens depending on the scanning angle, wherein said method further comprises:

referring to a lookup table, that stores data indicative of a change in a beam diameter on the projection plane with respect to the scanning angle, to obtain the beam diameter that depends on the scanning angle;

calculating said emission time based on the obtained beam diameter;

generating, based on the emission time that has been calculated, a modulation waveform signal such that a resolving power contrast that is determined from a value of a convolution integral of a spatial expansion function for the modulation waveform signal is fixed for each pixel, and modulating the light beam based on the generated modulation waveform signal.

\* \* \* \* \*